United States Patent
Miranda

(10) Patent No.: US 10,270,519 B2
(45) Date of Patent: Apr. 23, 2019

(54) AIR-TO-GROUND CO-CHANNEL INTERFERENCE AVOIDANCE SYSTEM

(71) Applicant: GOGO LLC, Chicago, IL (US)

(72) Inventor: Heinz A. Miranda, Cary, IL (US)

(73) Assignee: GOGO LLC, Chicago, IL (US)

( * ) Notice: Subject to any disclaimer, the term of this patent is extended or adjusted under 35 U.S.C. 154(b) by 0 days.

(21) Appl. No.: 15/228,209

(22) Filed: Aug. 4, 2016

(65) Prior Publication Data
US 2018/0041267 A1   Feb. 8, 2018

(51) Int. Cl.
| H04B 7/185 | (2006.01) |
| H04W 28/16 | (2009.01) |
| H04W 88/04 | (2009.01) |

(52) U.S. Cl.
CPC .......... *H04B 7/1851* (2013.01); *H04B 7/185* (2013.01); *H04B 7/18506* (2013.01); *H04B 7/18508* (2013.01); *H04B 7/18521* (2013.01); *H04W 28/16* (2013.01); *H04W 88/04* (2013.01)

(58) Field of Classification Search
CPC .......... H04B 7/18506; H04B 7/18508; H04W 84/06; H04W 16/14; H04W 28/048
See application file for complete search history.

(56) References Cited

U.S. PATENT DOCUMENTS

| 5,444,762 A * | 8/1995 | Frey .................. H01Q 1/246 343/713 |
| 6,219,559 B1 | 4/2001 | Hill et al. |
| 6,388,997 B1 | 5/2002 | Scott |
| 7,031,295 B2 | 4/2006 | Schafer |
| 7,436,901 B2 | 10/2008 | Tynderfeldt et al. |
| 8,345,565 B2 | 1/2013 | Hirsch |
| 8,437,798 B2 | 5/2013 | Fabien et al. |
| 8,717,912 B2 | 5/2014 | Wakabayashi et al. |
| 8,958,833 B2 | 2/2015 | Madan et al. |

(Continued)

FOREIGN PATENT DOCUMENTS

| CN | 104270169 A | 1/2015 |
| EP | 1311076 A1 | 5/2003 |

(Continued)

OTHER PUBLICATIONS

Guerrini, M., "A non-periodic sensing strategy for improved throughput in cognitive radio networks", IEEE Acoustics, Speech and Signal Processing (ICASSP), published May 2014.

(Continued)

*Primary Examiner* — Dong-Chang Shiue
(74) *Attorney, Agent, or Firm* — Marshall, Gerstein & Borun LLP; Randall G. Rueth

(57) ABSTRACT

Techniques to reduce scheduling grants to minimize or eliminate the use of control channels, at the expense of flexibility, allow protection of the system from unnecessary retransmissions in case of interference from the primary system. Use of a single grant to allocate a set of resources across all carriers, or communication channels simplifies the system at the cost of retransmission of a grant for all carriers in the case if interference corrupts the transmission of a subset of the carriers. Thus, complementing a single grant embodiment with detection of the affected frequency carriers or victim carriers and remove such carriers from the carrier aggregation configuration allows more efficient use of the allocated spectrum.

22 Claims, 7 Drawing Sheets

(56) References Cited

U.S. PATENT DOCUMENTS

| | | |
|---|---|---|
| 8,965,426 B2 | 2/2015 | Sambhwani et al. |
| 9,125,163 B2 | 9/2015 | Palanki et al. |
| 9,225,481 B2 | 12/2015 | Damnjanovic et al. |
| 9,232,526 B2 | 1/2016 | Novak et al. |
| 9,240,845 B2 | 1/2016 | Quan et al. |
| 9,288,770 B2 | 3/2016 | Loehr et al. |
| 2002/0155811 A1* | 10/2002 | Prismantas ........ H04B 1/1027 455/63.1 |
| 2007/0021060 A1 | 1/2007 | Karabinis et al. |
| 2009/0111463 A1 | 4/2009 | Simms et al. |
| 2010/0189089 A1* | 7/2010 | Lynch ................ H04W 84/005 370/338 |
| 2010/0278123 A1 | 11/2010 | Fong et al. |
| 2011/0122808 A1 | 5/2011 | Pandharipande et al. |
| 2011/0263199 A1* | 10/2011 | Cruz ................ H04B 7/18506 455/12.1 |
| 2012/0200458 A1* | 8/2012 | Jalali .................. H01Q 1/2291 342/372 |
| 2013/0028346 A1* | 1/2013 | Hottinen ............... H04W 16/14 375/285 |
| 2013/0045771 A1 | 2/2013 | Martin et al. |
| 2013/0083737 A1* | 4/2013 | Earnshaw ............ H04L 1/1887 370/329 |
| 2013/0208587 A1 | 8/2013 | Bala et al. |
| 2013/0301450 A1 | 11/2013 | Geirhofer et al. |
| 2016/0029236 A1 | 1/2016 | Sudo |

FOREIGN PATENT DOCUMENTS

| | | |
|---|---|---|
| EP | 1367846 A1 | 12/2003 |
| WO | WO-2014205664 A1 | 12/2014 |
| WO | WO-2015144208 A1 | 10/2015 |

OTHER PUBLICATIONS

International Search Report and Written Opinion for International Application No. PCT/US2017/044327 dated Oct. 24, 2017.

* cited by examiner

AIR-TO-GROUND CO-CHANNEL INTERFERENCE AVOIDANCE SYSTEM

FIELD OF THE DISCLOSURE

Technical Field

This disclosure generally relates to adaptive systems to avoid interference in shared air-to-ground communication systems. More particularly, this disclosure relates to an efficient single grant scheme across multiple air-to-ground communication channels and an adaptive system that detects and reacts to changing channel conditions allowing the co-presence of multiple primary and secondary users.

Background

Telecommunication systems often take advantage of secondary use of radio spectrum and communication channels to maximize the use of frequency bands with advantageous performance characteristics and manage these limited frequency bands within a geographical region. For example, in the United States, the Federal Communications Commission (FCC) may issue primary and secondary users licenses to operate in the same frequency band, with the stipulation that the secondary user cannot cause, or at least minimize, harmful interference to the primary user. One example of this is in air-to-ground (ATG) communication systems that act as secondary users together with primary Ku band satellite users. ATG communication systems typically provide a direct line of site between the aircraft stations (AS) and the ground stations (GS), for example by providing connectivity to commercial aircraft that fly at 10,000 feet or above.

The radio propagation conditions of ATG systems differ significantly from conventional cellular systems for ground coverage. One particular difference relates to the low frequency selectivity of the frequency bands air-to-ground communication systems operate due to the absence of ground-based scatterers. These conditions allow simplification of systems in the scheduling of radio resources that otherwise require additional complication in ground-based only systems. However, as air-to-ground communication systems are assigned as secondary users of the frequency spectrum, additional restrictions are added to the system, in particular related radiated power and the spatial configurations to avoid interfering with primary users.

4G cellular technologies, like Long-Term Evolution (LTE), possess efficiency advantages, able to work with wide bandwidths, and scale easily to even larger bandwidths with features such as carrier aggregation. However, the current LTE specification requires significant signaling on the control channel to manage the diverse channel conditions that the specification supports. Employing a direct use of the LTE type specification on an ATG system would require a robust control channel in all frequency carriers which cannot always be guaranteed, particularly in the case of secondary frequency use.

Techniques to reduce scheduling grants that minimize or eliminate the use of control channels, at the expense of flexibility, allow lower transmit power on the control channels reducing the interference to the primary system. One embodiment includes use of a single grant to allocate a set of resources across all carriers, or communication channels. This simplification comes at the cost of retransmission of data for all carriers in the case if interference corrupts the transmission of a subset of the carriers. Complementing the single grant embodiment with detection of the affected frequency carriers or victim carriers and remove such carriers from the carrier aggregation configuration allows more efficient use of the allocated spectrum. Therefore, scheduling of multiple carriers with a single grant complemented with a method to perform interference detection may provide significant advantages, particularly in an ATG use case.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, an air-to-ground communication system includes a computer processor and a transceiver capable of communicating on a plurality of air-to-ground communication channels using at least one communication service. The computer processor is configured to cause the transceiver to allocate at least two communication channels to one communication service, monitor the at least two communication channels for at least one source of interference, and avoid the at least one source of interference.

In another embodiment, a method performed by a computer processor includes, configuring a transceiver to allocate at least two air-to-ground communication channels to one communication service, monitoring for at least one source of interference during the guard time, and avoiding the at least one source of interference. The communication channels may include a guard time where the transceiver halts transmission.

BRIEF DESCRIPTION OF SEVERAL VIEWS OF THE DRAWINGS

The Figures described below depict various aspects of the system and methods disclosed herein. It should be understood that each figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein.

Figure 1:
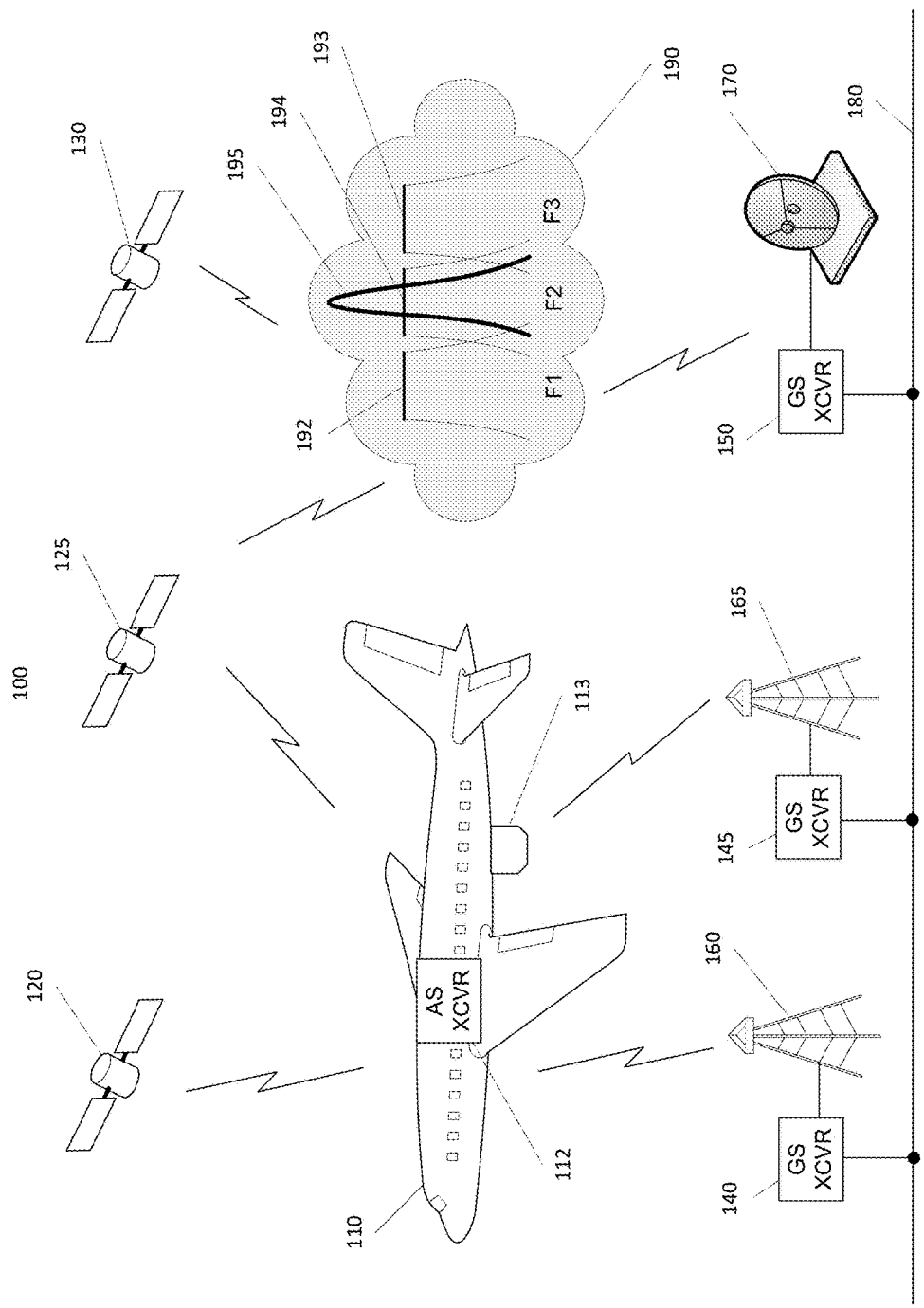
FIG. 1 illustrates an air-to-ground communication system including primary and secondary users of communication channels.

The Figures depict preferred embodiments for purposes of illustration only. Alternative embodiments of the systems and methods illustrated herein may be employed without departing from the principles of the invention described herein.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

One embodiment of the present disclosure includes use of a single grant to allocate the same set of resources across all carriers. This embodiment utilizes the flat frequency nature of ATG systems and minimizes the use of the control channel, thereby enabling additional schemes to protect the control channel from interference. An alternative embodiment includes configuring the granted carriers in a carrier aggregation scheme, depending on the interface condition status.

Two embodiments to detect interference in a single grant scheme include measurement and reporting at the aircraft and error detection at the ground station. Air-to-ground communication systems may implement measurement and reporting at the aircraft because, depending on implementation constraints, feedback from the aircraft station to the ground station may not be fast enough to minimize degradation in quality of service. Furthermore, once the interference condition is detected, a feedback notification represents the most efficient method to indicate when to clear the interference condition, although quick notification may not be critical at this stage.

On the forward link (the link from the ground station to the aircraft station) the aircraft station monitors, during the guard time, for example in a TDD protocol, the power received per carrier. Because no transmission is expected during the guard time, power measured in the guard time may be concluded to originate from an interfering system. The aircraft station may measure and filter the power level received and may compare the power level against a threshold. If the power exceeds the threshold, the aircraft station may send a notification to the ground station to remove the affected frequency carriers from the carrier aggregation configuration. In parallel, the ground station may monitor the block error rate (BLER) individually for all frequency carriers in the carrier aggregation configuration. If the BLER for a given frequency carrier exceeds a threshold, the corresponding frequency carrier may be removed from the carrier aggregation configuration. The system may clear the interference condition by notification from the aircraft station based on power measurements. The benefit added by parallel error detection at the ground station provides for fast detection in scenarios where fast notification from aircraft station may not be possible.

An alternative embodiment includes detection of a general interference condition, by the presence or absence of the scheduling grant acknowledgment. An absence of the grant acknowledgement may, for example, indicate the presence of high levels of atmospheric of systemic interference.

Because the scheduling procedure involves transmission of a scheduling grant in the forward link and the actual data transmission, in some embodiments simultaneously on differing frequencies, the acknowledgment received at the ground station may take one of three forms: a positive acknowledgment (data was successfully decoded), a negative acknowledgment (data decoding failed) or no acknowledgment at all. The absence of any acknowledgement may indicate two things: either the aircraft station never received the grant or the acknowledgment signal was corrupted on the reverse link. The link budget of the acknowledgment channel may include higher margin on the reverse link and the ground station may detect interference on the reverse link by monitoring the noise floor, thus an absence of an acknowledgment response may be used as an indication of high interference in the forward link.

On the reverse link (link from the aircraft station to the ground station), if channel sounding is available for all carriers in the carrier aggregation configuration, the Signal-to-noise ratio (SINR) may be monitored individually for each frequency carrier. When the SINR exceeds a threshold, the corresponding frequency carriers may be removed from the carrier aggregation configuration. An alternative embodiment includes monitoring the noise floor during the guard time. Furthermore, the ground station may monitor the reverse link BLER individually for all frequency carriers in the carrier aggregation configuration. If the error rate for a given frequency carrier exceeds a threshold, the corresponding frequency carrier may be removed from the carrier aggregation configuration. Clearing of the interference condition may in one embodiment be determined based on SINR measurements of the sounding signal, if available, otherwise another alternative embodiment includes a timer based implementation with exponential back-off.

One embodiment of the present disclosure includes a carrier aggregation scheme where multiple carriers are allocated with the same grant and an interference detection loop feeds the scheduler with information needed to exclude carriers that otherwise cause unnecessary retransmissions. Use of a single grant in a carrier aggregation system together with interference detection notification may enable the scheduler to make efficient use of resources.

Another embodiment includes using the guard time in a time division duplex (TDD) system to monitor for interference from a primary spectrum user into a secondary spectrum user with the objective of determining the reliability of the monitored frequency. Thus by monitoring the TDD guard time, interference from a primary user of the spectrum may be detected without modifying the protocol of the secondary user.

Yet another embodiment includes use of block error rate (BLER) statistics corresponding to a particular frequency carrier on a wideband frequency flat fading channel to determine the presence of interference on a given frequency carrier. BLER may be monitored to adjust the Modulation and Coding Scheme (MCS), allowing use of BLER in a wideband frequency flat fading channel as an indication of a different type of perturbation in one particular channel. Taking advantage of the wideband flat nature of air-to-ground communication channels, regular perturbations in the channel should affect all frequency carriers in the same way.

Still another embodiment of the present disclosure includes use of the absence or presence of the acknowledgment channel as an indication of high interference on the forward link. As air-to-ground communication channels exhibit frequency flat characteristics, regular perturbations in the channel may affect all frequency carriers in the same way. The absence of acknowledgment may indicate the corresponding frequency is being affected by external interference and therefore may be removed from scheduling procedures.

Single grant schemes that allocate resources on multiple carriers, such as in primarily ground-based systems may include many scheduling techniques that rely in the use of grants. However, using a single grant to allocate resources across multiple wideband carriers typically may not be employed due to the frequency selective nature of the channels between ground based stations. However, the wireless channels in ATG communication systems that serve aircraft at 10,000 feet and above exhibit frequency flat response characteristics that allows use of a single grant to allocate resources across multiple frequency carriers. Nevertheless, as the probability of interference still exists, for example from primary users of the frequency spectrum, monitoring and avoidance techniques may be employed to remove a victim carrier to make efficient use of shared radio resources.

Conventional techniques for sensing interference may rely on modification of protocols to force silence periods for the purpose of interference sensing. One embodiment of the present disclosure however, allows use of the existing guard time inherent to TDD schemes for a use different than the one it was originally conceived for. This embodiment may not only avoid the redesign of the air interface protocol, but may make efficient use of the available bandwidth by multiple authorized users.

Embodiments employing scheduling multiple frequency carriers with a single grant exhibits particular advantages of reduced communications overhead. Additionally, scheduling the control channel that carries the grant on any component carrier adds greater flexibility in the protocol algorithm to choose the channel where the grant may be transmitted. Such an embodiment may minimize the impact of interference on the control channel.

Measuring interference during the time guard of a TDD system allows efficient use of capacity by avoiding scheduling silent periods within the air interface protocol by detecting external interference with no additional overheard. Such an embodiment may differ from embodiment where silent periods must be explicitly scheduled to perform interference measurements.

In some embodiments, interference may be detected by direct measurement of power levels in the frequency of interest. Other embodiments may include detecting interference by measuring the quality of service, for example using BLER, because a number of additional factors may influence the BLER metric. ATG wireless channels, however, rarely exhibit different BLER by different component carriers unless the cause is interference of different system. Thus, ATG wireless channel interference detection by BLER characterization may allow suitable interference detection and allows fast reaction from the scheduler due to lack of a notification requirement from the AS, in particular if the signaling feedback from the AS is not fast enough to remain effective.

One particular embodiment may include an ATG communication system that utilizes a 4G LTE wireless protocol by making secondary use of the Ku band. In such an embodiment the LTE protocol may require modification to meet the unique requirements of the ATG wireless channel, particularly with regarding the shared secondary use of the spectrum. Embodiments that minimize the amount of customization needed to the LTE specification provide robust wireless links with proven technologies at a minimum development cost.

Other alternative embodiments may include dedicated grants on each subcarrier. However, these embodiments may require separate control channels on each subcarrier that may reduce flexibility on the control channel to deal with interference. A small payload on the control channel may remain preferable not only to allow operation at low SINR, but also to enable use of other techniques for interference avoidance.

An alternative embodiment to utilizing the existing guard time for interference measurement includes scheduling silence periods within the air interface protocol, however this embodiment may reduce the effective available bandwidth.

Still another alternative embodiment that detects interference by BLER monitoring includes direct measurement of the channel. Such an embodiment may provide advantages for detecting when an interference condition has passed by direct measurement using a fast feedback link to allow the scheduler to react fast enough to effectively utilize the free channel.

Techniques described herein may improve the efficiency of communication channels that exhibit frequency flat characteristics, such as air-to-ground channels from aircraft, or alternatively satellite communication systems.

Turning to the exemplary communication system 100 illustrated in FIG. 1, the system 100 includes a variety of primary users of a limited frequency spectrum, for example communication satellites 120, 125, and 130. Such communication satellites 120, 125, and 130 may operate in Ku band, or other satellite communication channels, in some embodiments as a primary or alternatively as a secondary user of frequency spectrum allocated by license by a governmental authority.

The illustrated frequency/magnitude plot 190 includes a variety of frequencies F1, F2, and F3, corresponding to a set of communication channels allocated to secondary users of an air-to-ground communication system. The frequency/magnitude plot 190 includes a communication signal 195 that may originate from one or all of the communication satellites 120, 125, or 130, or from a satellite ground station 170, that interferes with an air-to-ground communication signal 194 on frequency F2. The air-to-ground communication signal 194 may originate or be received by an aircraft 110, using an air-to-ground antenna 113 and an aircraft station transceiver 112. In some embodiments, the primary user of a Ku band frequency may correspond to an uplink transmission from a satellite ground station 170 to a satellite 120, 125, or 130. For example, a satellite ground station 170 may include a ground station transceiver 150 configured to transmit with an upward facing gain lobe while communicating with a satellite 120, 125, or 130 and an aircraft 110 may pass through the gain lobe. However, in other embodiments, the primary user may transmit downlink signals from a satellite 120, 125, or 130 to a satellite ground station 170 and the aircraft 110 may experience interference while transmitting or receiving on the shared channel.

The air-to-ground communications signals F1, F2, and F3 of the frequency/magnitude plot 190 may in some embodiments originate or be received by ground station antennas 160 or 165, each with ground station transceivers 140 and 145. The antennas 160 and 165, and the ground station transceivers 140 and 145 may interconnect and coordinate using a ground based network 180. In some embodiments the ground stations may interconnect with satellite ground stations 170 and satellite ground station transceivers 150 that generate interference on shared communication channels, such as illustrated in the frequency/magnitude plot 190, or otherwise.

The aircraft transceiver 112 to ground station 140 and 145 communications may occur as secondary users of allocated frequency spectrum to primary aircraft 110 to satellite 120, 125, and 130 communications, or primary ground 170 to satellite 120, 125, and 130 communications. The primary and secondary licensees may be assigned by one or a variety or governmental agencies that may or may not change as the aircraft 110 travels over international borders or operates controlled or uncontrolled airspace. While a frequency/magnitude plot 190 is illustrated in FIG. 1, other embodiments considered herein may include time-division multiplexed systems wherein the communications channels are time assigned versus frequency assigned. Other embodiments may include communications protocols that multiplex by code division, for example in cellular CDMA networks.

Figure 2:
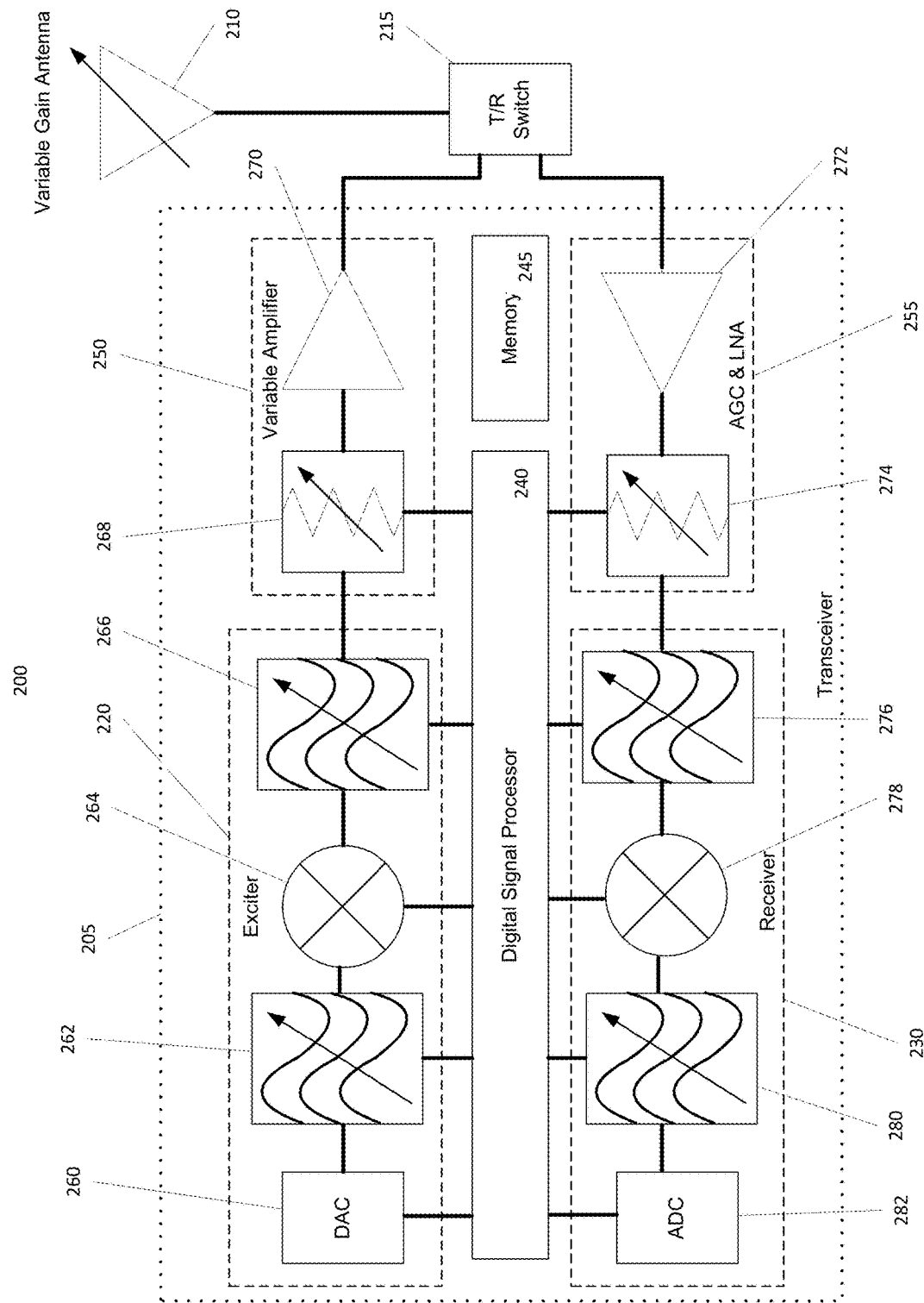
FIG. 2 illustrates an exemplary air-to-ground transceiver, according to an embodiment of the present disclosure.

FIG. 2 illustrates an exemplary embodiment of an air-to-ground transceiver system 200, that may in some embodiments include the aircraft station (AS) transceiver 112 and antenna 113, or alternatively the ground station (GS) transceivers 140 and 145 and antennas 160 and 165. The transceiver system 200 includes a variable gain antenna 210 that may in some embodiments modify its gain by moving the elements of the antenna to increase gain in a particular direction or modify the shape of the antenna to change the radiation pattern of the antenna during receive or transmit. Such modifications may in some embodiments improve reception of communications between stations when a directionality to a receiving station is otherwise available to the transceiver system 200. In other embodiments the antenna 210 may modify itself to match an impedance or tune to minimize a standing wave ratio (SWR) across a variety of frequency ranges during transmit or receiving communications.

The variable gain antenna 210 connects through a transmit/receive (T/R) switch 215 to a transceiver 205. The T/R switch 215 may allow both transmit and receive to occur simultaneously on the same antenna or switch or multiplex among a variety of antenna elements according to a desired transmit or receive frequency.

The exemplary transceiver 205 may include a variety of elements, but various embodiments may include some but not all of such embodiments as required to transmit and receive on particular communication channels. The embodiment illustrated in FIG. 2 is exemplary in nature and the aircraft station (AS) transceiver 112 or ground station (GS) transceivers 140, 145, and 150 do not necessarily require any of all of the illustrated elements therein. The transceiver 205 includes an optional internal variable amplifier 250 on the end of a transmit path from an exciter 220. The exciter 220 and variable amplifier 250 may receive control from a digital signal processor 240 with associated memory 245.

In combination, or in some embodiments as a separate device, the transceiver may include a receiver 230 and an automatic gain control (AGC) and low-noise amplifier (LNA) assembly 255 in a receive path from the T/R switch 215. The receiver 230 may receive control and data from the digital signal processor (DSP) 240.

In one embodiment, the variable amplifier 250 may include an amplification circuit 270 that increases the power of an RF signal and ensures the integrity of an output signal provided to the T/R switch 215. The variable amplifier 250 may likewise include a variable attenuator 268 that reduces power of a signal provided to the amplifier to improve the integrity or efficiency of the amplifier 250. The variable attenuator may receive control from the DSP 240.

The exemplary exciter 220 may include a digital to analog converter (DAC) 260 that generates analog signal from a digital input from the DSP 240. In some embodiments this may include in-phase and quadrature digital representations that are processed by the DAC 260. The DAC 260 may output to a tunable filter 262 to improve the integrity of the transmitted signal, such as removing harmonics or noise generated by the DAC 260. The exciter 220 may also include an upconverter 264 that translates a baseband signal output from the tunable filter 262 to an RF frequency using a reference oscillator that is not illustrated.

The upconverter 264 may receive control and data from the DSP 240. Outputs of the exciter 264 may enter another tunable filter 266 that receives control from the DSP 240 to remove or attenuate intermodulation products, additional harmonics and noise before an RF signal enters the variable amplifier 250. The exciter 220 may in some embodiments be a separate assembly, shielded with coaxial connections for analog/RF signals and digital signal inputs for control and data. In some embodiments, the DSP 240 may select notch filters of bandwidth specific filters in the tunable filters 262 and 266 to meet the requirements of a particular communication protocol or to eliminate interference.

The AGC and LNA assembly 255 may include a low-noise amplifier 272 that increases the received signal strength of a signal from the T/R switch without substantially increasing the noise floor. Likewise, a variable attenuator 274 controlled by the DSP 240 may adjust the signal strength to an appropriate level for the receiver 230 to operate efficiently.

In one embodiment, the transceiver includes a receiver 230 that receives an RF signal from the AGC and LNA assembly 255. The receiver 230 may include a tunable filter 276 controlled by the DSP 240 that allows for attenuation of noise outside a particular frequency band to improve the efficiency of a downconverter 278. The downconverter 278 controlled by the DSP 240 may translate a received RF signal to baseband using an external frequency reference that is not illustrated. Further tunable filtering 280, likewise controlled by the DSP 240 may remove byproducts of downconversion and optimize the baseband signal for conversion by the analog to digital converter (ADC) 282. The output of the ADC 282 interface to the DSP 240, for example as a serial or parallel high-speed digital interface, for example with in-phase and quadrature signals.

Figure 3:
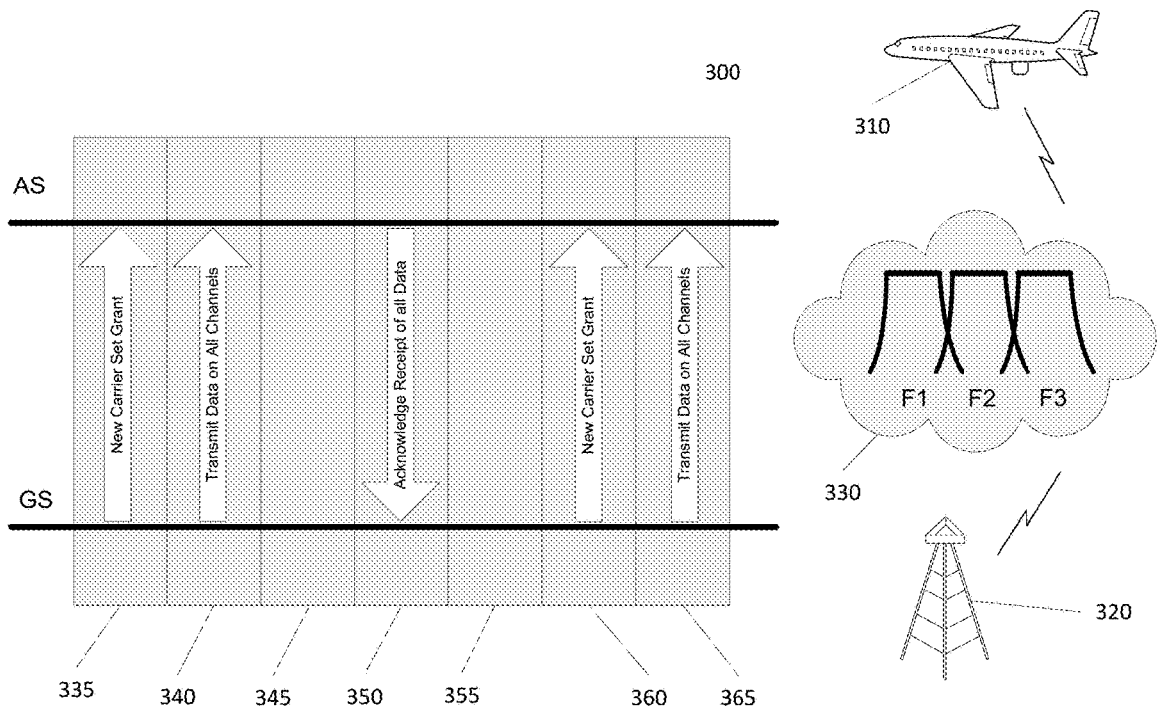
FIG. 3 illustrates a block diagram outlining a method for communications between an airborne transceiver and a ground-based transceiver, according an embodiment of the present disclosure.

Turning to the block diagram 300 in FIG. 3, illustrating a process for air-to-ground communications, an aircraft 310 communicates with a ground station 320, using a plurality of communication channels at frequencies F1, F2, and F3, illustrated in the frequency/magnitude diagram 330. In the exemplary embodiment, when the signal strength is sufficient to allow reception of the signal (block 335) a ground station (GS) transmits a new grant, and (block 340) transmits data on all of the granted channels. In one embodiment, blocks 335 and 340 may represent transmissions occurring on separate frequencies, or in another embodiment, transmissions occurring at differing times. The aircraft station (AS) may process the data (block 345), and generate acknowledgements.

The illustrated embodiment includes signal strength sufficient to successfully receive data at the aircraft station (AS), thus the AS (block 350) transmits acknowledgement of receipt of all data to the GS. The GS may process the acknowledgements (block 355) and prepare a new grant to transmit (block 360) and transmit data again on all channels (block 365). In one embodiment, blocks 360 and 365 may represent transmissions occurring on separate frequencies, or in another embodiment, transmissions occurring at differing times. In some embodiments the process may continue indefinitely as data is transmitted and received successfully. In other embodiments, the process may occur in the opposite direction, wherein data is transmitted from the aircraft station (AS) to the ground station (GS).

Figure 4:
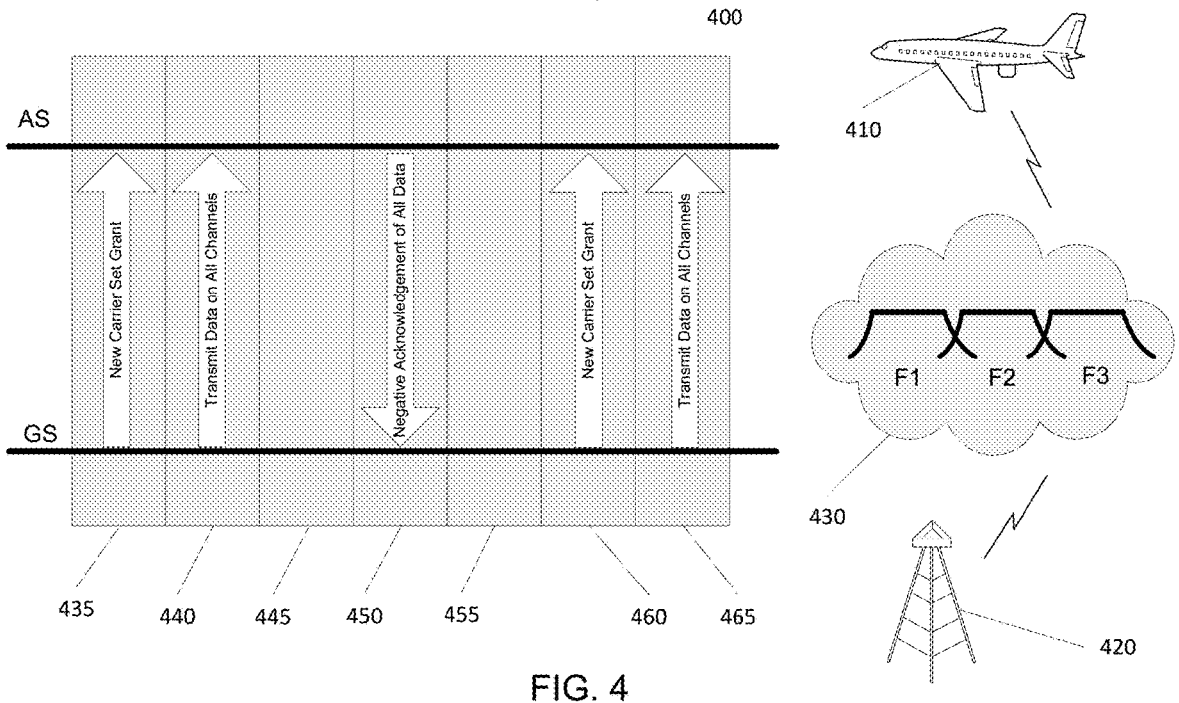
FIG. 4 illustrates a block diagram outlining a method for communications between an airborne transceiver and a ground-based transceiver in the presence of atmospheric attenuation, according to an embodiment of the present disclosure.

FIG. 4 includes a block diagram 400 illustrating a method similar to FIG. 3, but in the presence of substantial atmospheric attenuation that affects a number of frequency channels. An aircraft 410 communicates with a ground station 420 using three frequencies F1, F2, and F3, as illustrated in the frequency/magnitude plot 430. However, in the illustrated embodiment of FIG. 4, the signal strength on each frequency is substantially reduced and prevents reception in proximity to a noise floor.

For example, the ground station (GS) transmits (block 435) a new grant to the aircraft station (AS) and (block 440) transmits data on all channels. In one embodiment, blocks 435 and 440 may represent transmissions occurring on separate frequencies, or in another embodiment, transmissions occurring at differing times. The AS attempts to process (block 445) the data transmitted from the GS but fails, and (block 450) transmits negative acknowledgements for all data to the GS. The GS processes the negative acknowledgements (block 455) and generates a new grant, transmitted to the AS (block 460), and followed up data on all channels again (block 465). In one embodiment, blocks 460 and 465 may represent transmissions occurring on separate frequencies, or in another embodiment, transmissions occurring at differing times. However, in the presence of continuing atmospheric interference, such data will continue to experience difficulty in reception at the AS, in which case the GS may send a more conservative MCS to improve signal reception.

Figure 5:
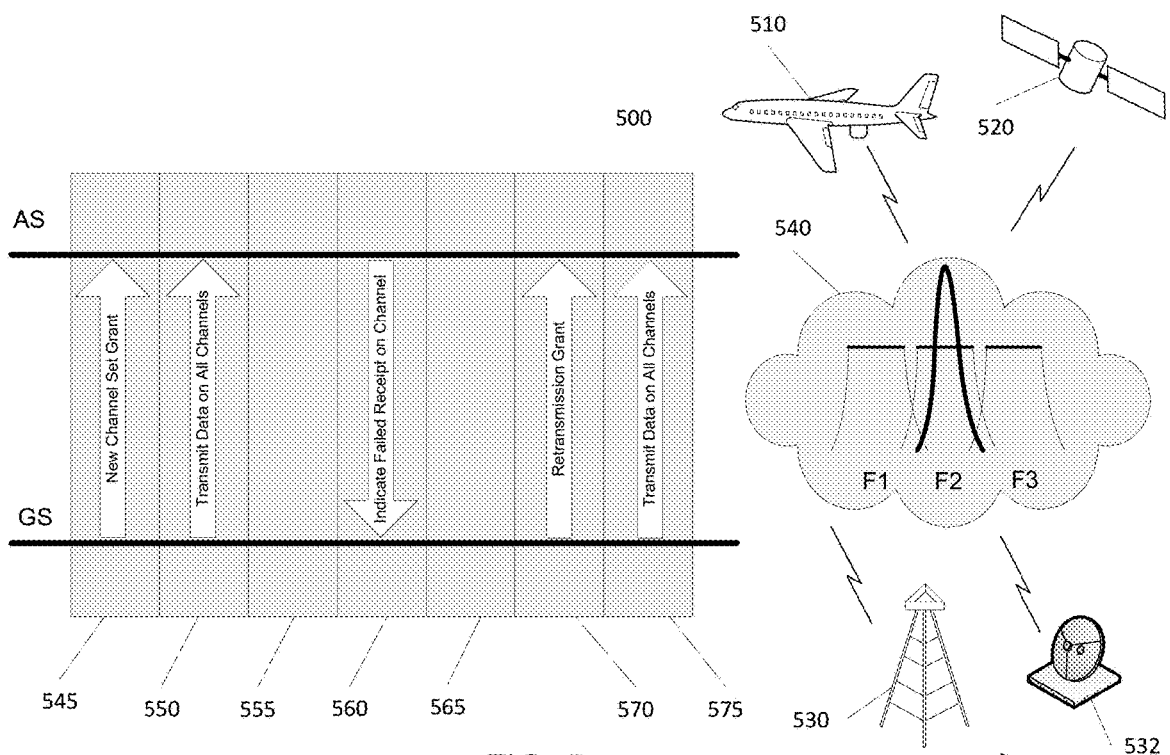
FIG. 5 illustrates a block diagram outlining a method for communications between an airborne transceiver and a ground-based transceiver in the presence of primary user interference, according to an embodiment of the present disclosure.

FIG. 5 includes an exemplary block diagram 500 illustrating a process wherein a primary user 520, such as a communications satellite that communicates with a satellite ground station 532, generated interference for a secondary user 510, such as an aircraft that communicates with a ground station 530. The frequency/magnitude plot 540 illustrates that at frequency F2 a strong signal from the primary user 520 interferes with a weaker signal from the secondary user 510.

The GS transmits a new channel set grant to the AS (block 545), including for example F1, F2, and F3 then transmits data on all channels (block 550). In one embodiment, blocks 545 and 550 may represent transmissions occurring on separate frequencies, or in another embodiment, transmissions occurring at differing times. The AS may process the data received from the GS (block 555), but detects interference in the data received on F2, for example by error detection or detecting a power of an interfering signal, and (block 560) indicates failed receipt on F2, but indicates successful receipt on F1 and F3. The GS may store data in a memory relating to detected interference on F2 (block 565), and prepare a new retransmission grant for transmission (block 570). The transmission grant (block 570) includes a re-transmission indication and is in other embodiments similar to the new grant (block 545) and in some embodiments the GS may transmit data on all channels (block 575). In one embodiment, blocks 570 and 575 may represent transmissions occurring on separate frequencies, or in another embodiment, transmissions occurring at differing times.

Figure 6:
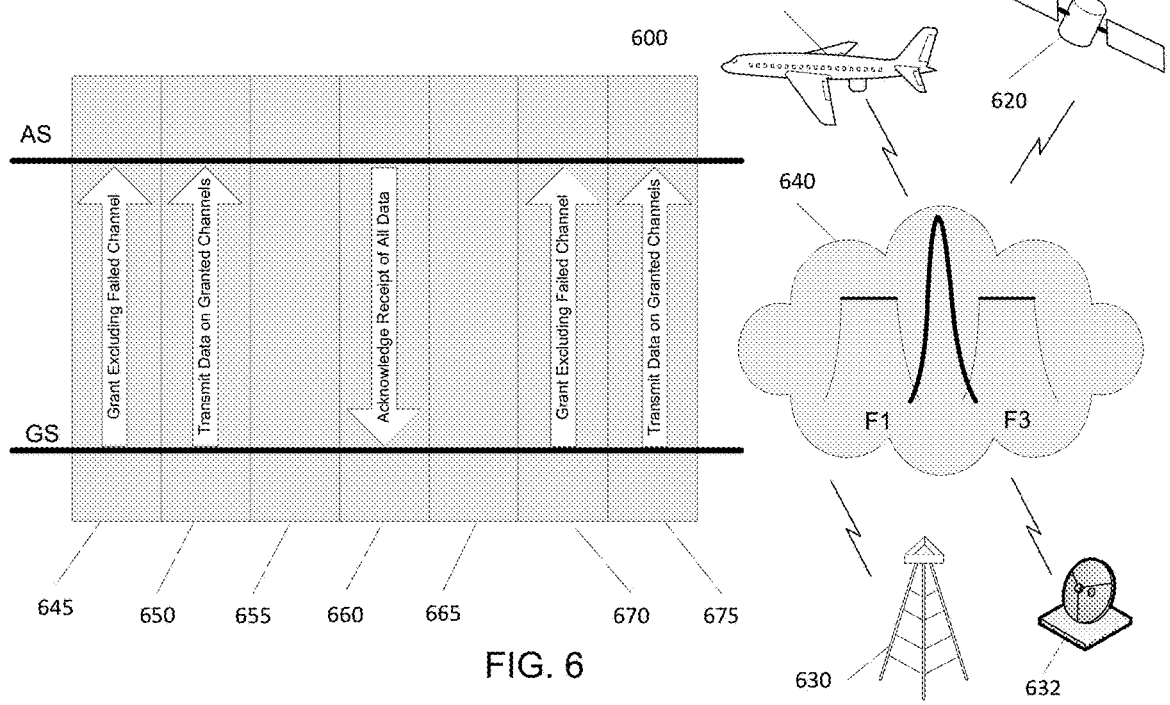
FIG. 6 illustrates a block diagram outlining a method for interference avoidance in communications between an airborne transceiver and a ground-based transceiver in the presence of primary user interference, according to an embodiment of the present disclosure.

An alternative embodiment illustrated in FIG. 6 includes block diagram 600 that wherein a primary user 620, such as a communications satellite that communicates with a satellite ground station 632, generates interference with a secondary user 610, such as an aircraft, that communicates with a ground station 630. The frequency/magnitude plot 640 however illustrates that at frequency F2 a strong signal from the primary user 520 operates in the absence the secondary user. Such an approach may allow co-existence of the primary and secondary users.

The ground station (GS) may retrieve interference information (block 645), for example from the memory 245, from the process illustrated in FIG. 5, or otherwise, and transmit a grant, and transmit data excluding the interfering channels (block 650). The grant, in some embodiments, may be carrier agnostic and indicate the sub-carriers allocated to the MCS, allowing a small grant overhead. Thus, for carriers lacking data, a receiving station may fail to respond with an acknowledgement message, and the transmitting station would understand a particular carrier was not intended to carry information. In one embodiment, blocks 645 and 650 may represent transmissions occurring on separate frequencies, or in another embodiment, transmissions occurring at differing times. The AS processes the data received successfully (block 655) and transmits acknowledgements (block 660) to GS for receipt of all data. The GS generates a subsequent grant (block 655) again excluding failed channels and transits the grant to the AS (block 670). The GS may again transmit data on all granted channels to the AS (block 675). In one embodiment, blocks 670 and 675 may represent transmissions occurring on separate frequencies, or in another embodiment, transmissions occurring at differing times. Thus, according to this exemplary embodiment, data is transmitted only on known good channels.

Figure 7:
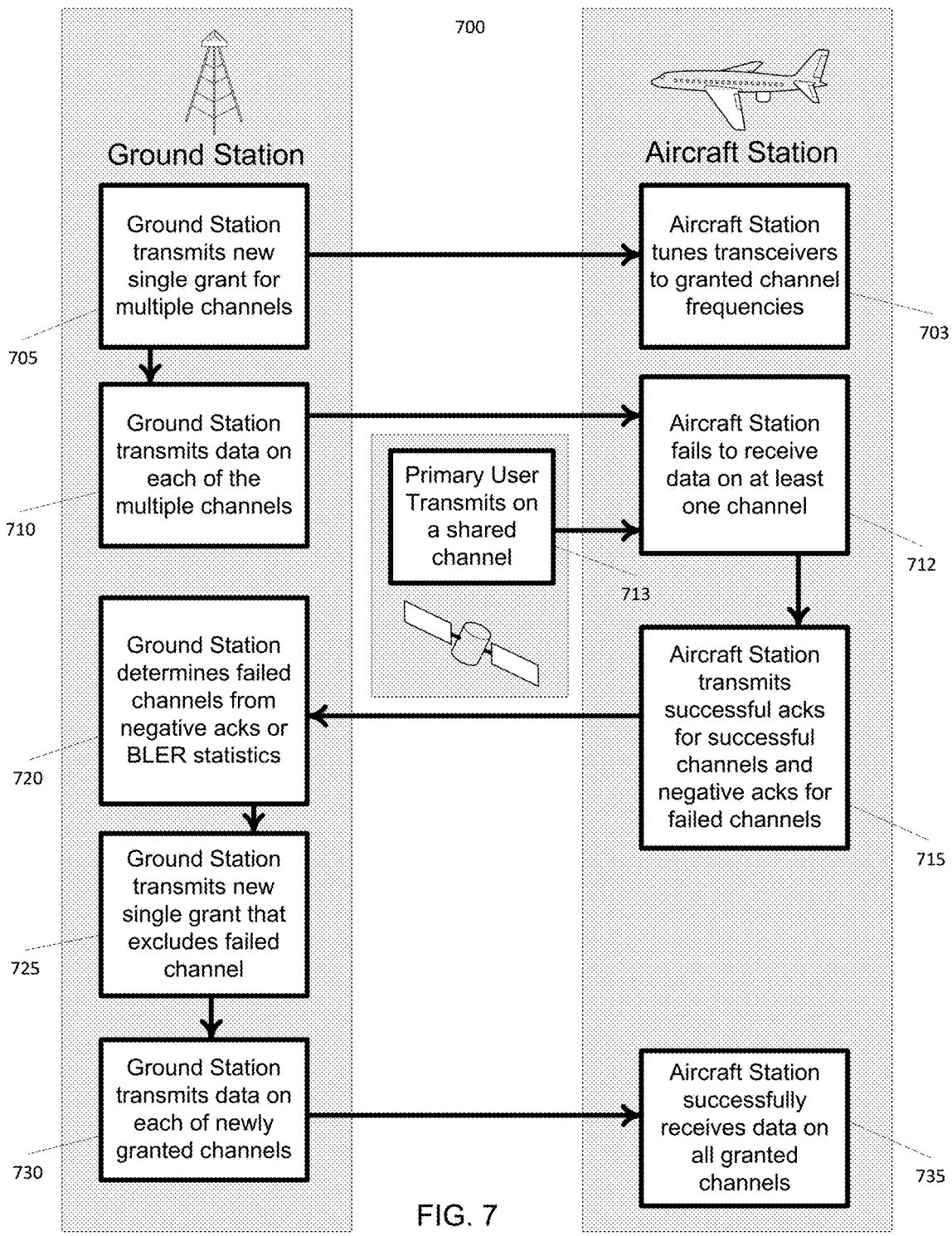
FIG. 7 illustrates a block diagram outlining a method for interference avoidance in the presence of a primary user of a communications channel, according to an embodiment of the present disclosure.

FIG. 7 illustrates another exemplary block diagram 700 outlining a process to detect and avoid interference in an air-to-ground communication system. A ground station may transmit a new single grant for multiple communication channels (block 705) and a aircraft station (block 703) receives the grant and tunes its transceivers to the granted channel frequencies. In one embodiment, the aircraft station may be configures to demodulate data from a number of semi-statically configured channels, and de-configure some channels with signaling messages. The ground station (block 710) transmits data on each of the multiple channels initially granted and (block 712) the aircraft station fails to receive data on at least one of the channels granted. In one embodiment, the aircraft station fails to receive data on a channel because the primary user transmits on a shared channel (block 713), and the interference prevents reception at the aircraft station.

The aircraft station transmits successful acknowledgements (block 715) corresponding to the channels where data was received successfully and transmits negative acknowledgements for channels where data was not received successfully. The positive and negative acknowledgements are received at the ground station (block 720) and the ground station determines the failed channels, together with BLER statistics measured by the ground station. The ground station may transmit a new single grant (block 725), and exclude the determined failed channels from scheduling to the aircraft station. The ground station transmits data on the remaining channels (block 730) not affected by interference and the aircraft station receives all data on the granted channels successfully (block 735).

Figure 8:
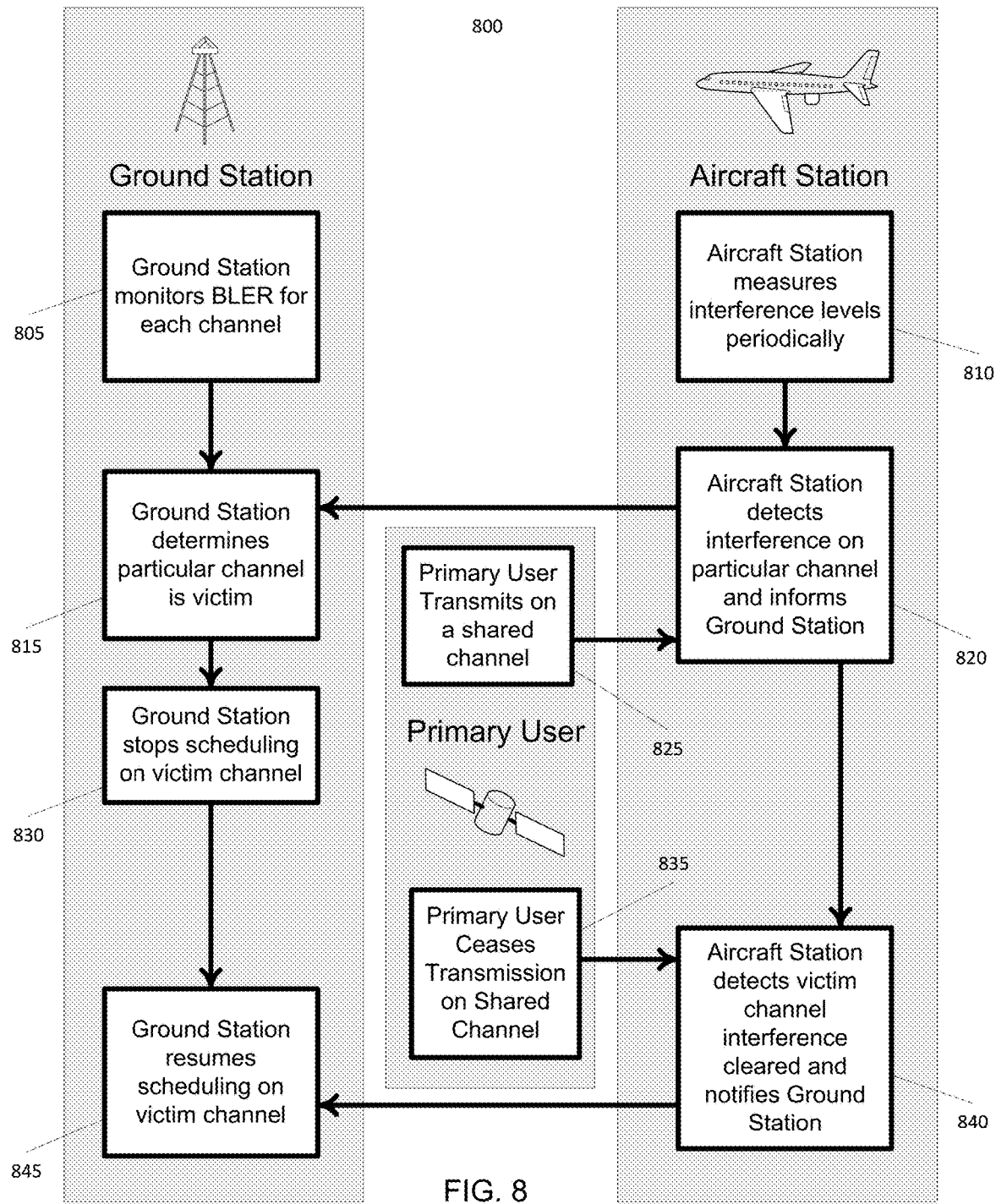
FIG. 8 illustrates a block diagram outlining an alternative method for avoiding interference from a primary user of a communications channel, according to an embodiment of the present disclosure.

Block diagram 800 of FIG. 8 illustrates an alternative embodiment wherein the aircraft station and ground station adapt to the primary user beginning to transmit and ceasing transmission on a shared channel. The ground station may monitor block error rates for each channel (block 805) and the aircraft station may measure interference levels periodically (block 810), for example during the guard times of a TDD protocol. The aircraft station may (block 820) detect interference on a particular channel, for example from a primary user on a shared channel (block 825), and inform the ground station. The ground station may use information relating to block error rates and interference levels to determine if a particular channel is a victim (block 815), for example of primary user transmissions on a shared channel (block 825). The ground station may stop scheduling on the victim channel (block 830) based on a determination of victim channels (block 815). The primary user may cease transmitting (block 835) on the shared channel and the aircraft station may detect the channel is clear and notify the ground station (block 840). With notification the victim channel is now clear the ground station (block 845) may resume scheduling on the victim channel.

Figure 9:
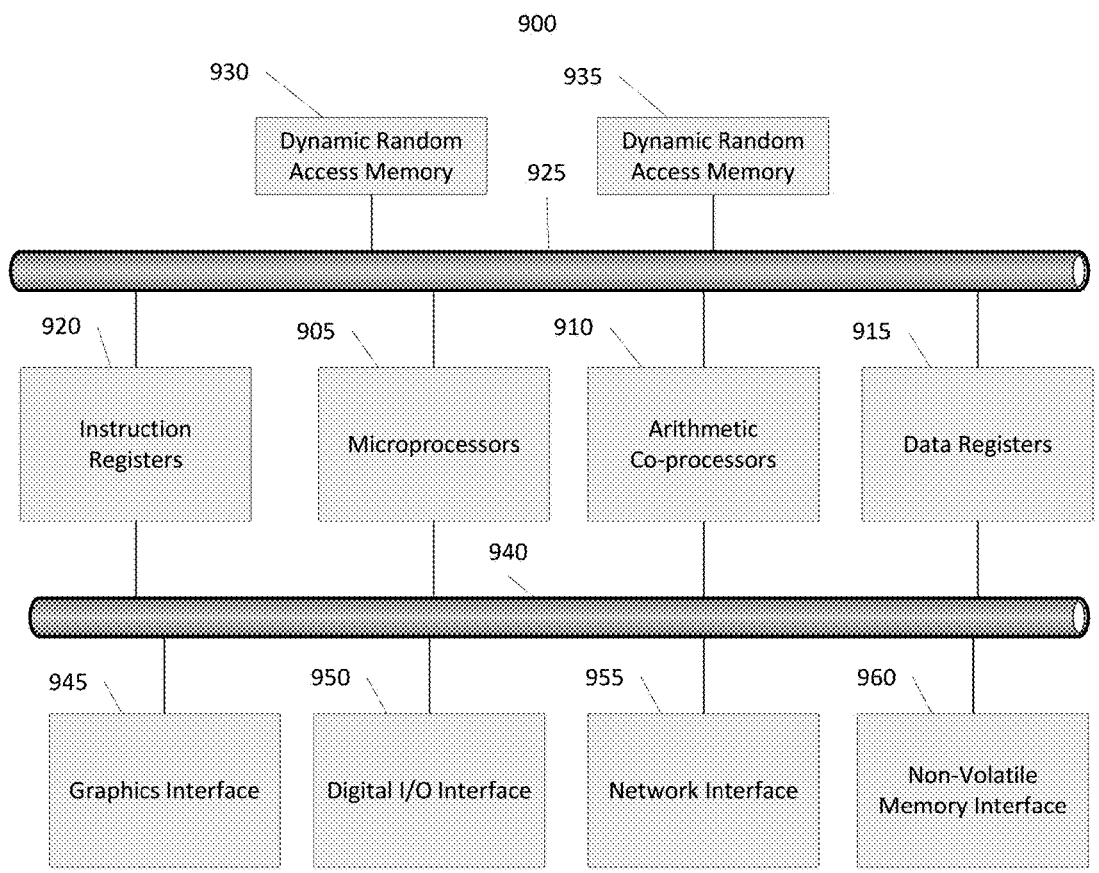
FIG. 9 illustrates an exemplary computing system, according to an embodiment of the present disclosure.

FIG. 9 illustrates an exemplary computing system 900, for example that may in some embodiments correspond to one or more DSPs 240 from FIG. 2, or otherwise, that includes one or more microprocessors 905, coupled to supporting devices through multi-access busses 925 and 940. Dynamic random access memory 930 and 935 may interface to data bus 925, and store data used by the one or more microprocessors 905. The system 900 includes instruction registers 920 that store executable instructions for the one or more microprocessors 905, and data registers 915 that store data for execution. In some embodiments, the system 900 includes one or more arithmetic co-processors 910, to assist or supplement the one or more microprocessors 905. Data bus 940 includes interfaces to a graphics interface 945 that may in some embodiments process and transmit graphical data for a user on a display or similar devices. Likewise, data bus 940 includes interfaces for a digital I/O interface that processes and transmits, for example, keyboard, pointing device, and other digital and analog signals produced and consumed by users or other machines. A network interface 955 processes and transmits encoded information over wired and wireless networks to connect the system 900 to other machines and users. Data bus 940 also includes at least one interface to a non-volatile memory interface, that may process and transmit data that resides on non-volatile memory devices.

Figure 10:
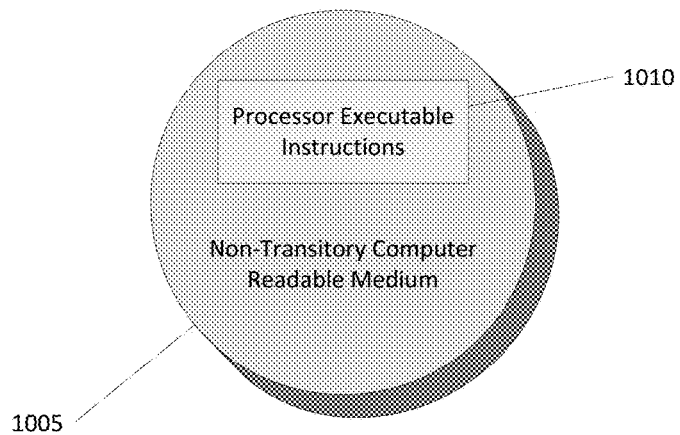
FIG. 10 illustrates a non-transitory computer readable medium, according to an embodiment of the present disclosure.

FIG. 10 illustrates a non-transitory computer readable medium 1005, that comprises processor executable instructions 1010. Such processor executable instructions may include instructions executed by the one or more DSPs 240 of FIG. 2.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. An air-to-ground communication system comprising:
a transceiver unit disposed within a ground station included in the air-to-ground communication system, the transceiver unit utilized by the air-to-ground communication system to communicate on a plurality of carriers, each carrier of the plurality of carriers being a different, respective communication channel corresponding to a different, respective frequency of a frequency spectrum utilized by the plurality of carriers, the air-to-ground communication system being a secondary user of the frequency spectrum utilized by the plurality of carriers, the secondary user utilizing the frequency spectrum to provide air-to-ground communications, and the secondary user being subject to one or more restrictions on at least one of power or spatial configuration to thereby allow co-presence of the primary user and the secondary user on the frequency spectrum, wherein the plurality of carriers is configured by the secondary user via grants communicated over a control channel; and
a computer processor coupled to the transceiver unit and configured to:

cause the transceiver unit to communicate, over the control channel, a first transmission grant indicating two or more of the plurality of carriers allocated to the transceiver unit to utilize for sending transmissions;

cause the transceiver unit to transmit, in accordance with the one or more restrictions and with the first transmission grant communicated by the transceiver unit, data on the indicated two or more of the plurality of carriers;

configure the transceiver unit to detect a transmission failure indicating that the transmitted data on a particular carrier of the two or more of the plurality of carriers has not been received by a receiving unit; and in response to detecting the transmission failure:
cause the transceiver unit to communicate, over the control channel, a retransmission grant excluding an indication of the particular carrier and including an indication of the other carriers of the two or more of the plurality of carriers indicated by the first transmission grant, and cause the transceiver unit to retransmit, to the receiving unit, in accordance with the one or more restrictions and with the retransmission grant communicated by the transceiver unit, the data on the two or more of the plurality of carriers.

2. The air-to-ground communication system of claim 1, wherein the transceiver unit is configured to operate in accordance with the one or more restrictions to which the secondary user is subjected on at least one of the plurality of carriers.

3. The air-to-ground communication system of claim 1, wherein the transceiver unit is configured to allow the primary user to transmit and receive on at least one of the plurality of carriers co-presently with the transceiver unit transmitting on the at least one of the plurality of carriers.

4. The air-to-ground communication system of claim 3, wherein the primary user comprises a satellite communication system.

5. The air-to-ground communication system of claim 1, wherein the air-to-ground communications comprise a digital modulation service and wherein the transceiver unit is configured to operate in accordance with the one or more restrictions to which the secondary user is subjected within at least one of the plurality of carriers using the digital modulation service.

6. The air-to-ground communication system of claim 1, wherein the computer processor is configured to cause the transceiver unit to monitor the two or more of the plurality of carriers for at least one source of interference by measuring a block error ratio (BLER) associated with the air-to-ground communications.

7. The air-to-ground communication system of claim 1, wherein the computer processor is configured to cause the transceiver unit to monitor the two or more of the plurality of carriers during a guard time of a time division duplex (TDD) communication protocol for the presence of at least one signal transmitted by the primary user.

8. The air-to-ground communication system of claim 1, wherein the computer processor is configured to cause the transceiver unit to avoid at least one source of interference by recording the carrier associated with the interference in a computer memory, and wherein the computer processor is configured to cause the transceiver to transmit the data on the other carriers of the two or more of the plurality of carriers.

9. The air-to-ground communication system of claim 1, wherein, to detect a transmission failure, the computer processor is configured to cause the transceiver unit to receive at least two acknowledgement signals associated with the two or more of the plurality of carriers, wherein the computer processor is configured to record in a computer memory the absence of the acknowledgement on the particular carrier of the two or more of the plurality of carriers as indicating the presence of interference on the particular carrier, and wherein the computer processor is configured to record in the computer memory the absence of two of the acknowledgements as indicating the presence of environmental interference.

10. A method, performed by a computer processor, comprising:

configuring a transceiver unit to be utilized by an air-to-ground communication system to communicate on a plurality of carriers, the transceiver unit disposed within a ground station included in the air-to-ground communications system, each carrier of the plurality of carriers being a different, respective communication channel corresponding to a different, respective frequency of a frequency spectrum utilized by the plurality of carriers, the air-to-ground communication system being a secondary user of the frequency spectrum utilized by the plurality of carriers, the secondary user utilizing the frequency spectrum to provide air-to-ground communications, and the secondary user being subject to one or more restrictions on at least one of power or spatial configuration to thereby allow co-presence of the primary user and the secondary user on the frequency spectrum, wherein the plurality of carriers is configured by the secondary user using grants communicated over a control channel, and wherein at least one of the communication services comprises a guard time where the transceiver unit halts transmission;

causing the transceiver unit to communicate, over the control channel, a first transmission grant indicating two or more of the plurality of carriers allocated to the transceiver unit to utilize for sending transmissions;

causing the transceiver unit to transmit, in accordance with the one or more restrictions and with the first transmission grant communicated by the transceiver unit, data on the indicated two or more of the plurality of carriers;

configuring the transceiver unit to detect a transmission failure indicating that the transmitted data on a particular carrier of the two or more of the plurality of carriers has not been received by a receiving unit; and in response to detecting the transmission failure:
causing the transceiver unit to communicate, over the control channel, a retransmission grant excluding an indication of the particular carrier and including an indication of the other carriers of the two or more of the plurality of carriers indicated by the first transmission grant, and causing the transceiver unit to retransmit, to the receiving unit, in accordance with the one or more restrictions and with the retransmission grant communicated by the transceiver unit, the data on the two or more of the plurality of carriers.

11. The method of claim 10, wherein the transceiver unit is configured to operate in accordance with the one or more restrictions to which the secondary user is subjected on at least one of the plurality of carriers.

12. The method of claim 10, wherein the transceiver unit is configured to allow the primary user to transmit and receive on at least one of the plurality of carriers co-presently with the transceiver unit transmitting on the at least one of the plurality of carriers.

13. The method of claim 12, wherein the primary user comprises a satellite communication system.

14. The method of claim 10, wherein the air-to-ground communications comprise a digital communication service, and wherein the transceiver unit is configured to operate in accordance with the one or more restrictions to which the secondary user is subjected within at least one of the plurality of carriers to provide the digital communication service.

15. The method of claim 10, comprising configuring the transceiver unit to monitor the two or more of the plurality of carriers for at least one source of interference by measuring a block error ratio (BLER) associated with the air-to-ground communications.

16. The method of claim 10, comprising configuring the transceiver unit to monitor the two or more of the plurality of carriers during the guard time of a time division duplex (TDD) digital communications protocol for the presence of at least one signal transmitted by the primary user.

17. The method of claim 10, comprising:
configuring the transceiver to avoid at least one source of interference by recording the carrier associated with the interference in a computer memory, and
configuring the transceiver to transmit the data on the other carriers of the two or more of the plurality of carriers.

18. The method of claim 10, wherein detecting the transmission failure comprises:
configuring the transceiver unit to receive at least two acknowledgement signals associated with the two or more of the plurality of carriers,
recording in a computer memory the absence of the acknowledgement on the particular carrier of the two or more of the plurality of carriers as indicating the presence of interference on the particular carrier, and
recording in the computer memory the absence of two of the acknowledgements as indicating the presence of environmental interference.

19. The method of claim 10, wherein at least one of the plurality of carriers is shared with a Ku band satellite service.

20. The method of claim 17, comprising:
retrieving from the computer memory the carrier associated with the interference,
configuring the transceiver unit to monitor the carrier for the absence of transmissions from a primary user of the carrier, and
configuring the transceiver to resume transmitting and receiving data on the carrier in the absence of transmissions from the primary user of the carrier.

21. The air-to-ground communication system of claim 1, wherein the detection of the transmission failure indicating that the transmitted data on the particular carrier of the two or more of the plurality of carriers has not been received comprises at least one of the following:
a detection of an error in the transmitted data on the particular carrier, or
a detection of an interfering signal on the particular carrier.

22. The method of claim 10, wherein configuring the transceiver unit to detect the transmission failure indicating that the transmitted data on the particular carrier of the two or more of the plurality of carriers has not been received comprises at least one of the following:
configuring the transceiver unit to detect an error in the transmitted data on the particular carrier, or
configuring the transceiver unit to detect an interfering signal on the particular carrier.

* * * * *